United States Patent

[11] 3,628,055

[72] Inventor Jackson Lum
 Bayside, N.Y.
[21] Appl. No. 886,163
[22] Filed Dec. 18, 1969
[45] Patented Dec. 14, 1971
[73] Assignee Sylvania Electric Products, Inc.

[54] STAIRCASE WAVEFORM GENERATOR
 8 Claims, 4 Drawing Figs.
[52] U.S. Cl..................................................... 307/227,
 307/228, 307/301
[51] Int. Cl....................................................... H03k 4/02
[50] Field of Search............................................ 307/246,
 321, 227, 228, 261, 283; 328/151

[56] References Cited
 UNITED STATES PATENTS
3,024,368  3/1962  Nagy............................. 307/225
3,031,583  4/1962  Murphy......................... 307/227
3,105,158  9/1963  Nichols......................... 307/227
3,111,591  11/1963 Conron et al.................. 307/225
3,158,757  11/1964 Rywak........................... 307/227
3,189,844  6/1965  MacKenzie.................... 307/228
3,201,611  8/1965  Mollinga....................... 307/227
3,353,104  11/1967 Loposer........................ 307/227
3,447,099  5/1969  Lockshaw...................... 307/228
3,497,725  2/1970  Loroitch, Jr................... 307/283

OTHER REFERENCES
Bray, " FET Keeps Long Staircase Steps Flat," Electronics, 3-18-68, page 94

Primary Examiner—Donald D. Forrer
Assistant Examiner—R. E. Hart
Attorneys—Robert J. Frank and Martin M. Novack ABSTRACT: An apparatus which receives a sequence of input pulses and generates a staircase waveform. The input pulses activate a sampler which samples the value of a periodic sawtooth voltage. The sampled values are maintained in the intervals between input pulses by holding capacitor. In a preferred embodiment the periodic sawtooth voltage is synchronized by the input pulses.

INVENTOR.
JACKSON LUM

R. J. Frank
ATTORNEY

3,628,055

STAIRCASE WAVEFORM GENERATOR

BACKGROUND OF THE INVENTION

This invention relates to waveform generators and more particularly to a circuit for generating a staircase waveform.

Signals having staircase-shaped waveforms are commonly used in transistor and vacuum tube curve tracers, frequency dividers, and sequential logic circuits. For example, in a vacuum tube curve tracer, a staircase voltage is applied to grid of the vacuum tube being tested so that characteristic curves of the tube for various values of grid voltage can be simultaneously displayed on a cathode-ray tube screen.

Conventional staircase waveform generators typically utilize a pulse integrator to form a staircase signal. A sequence of input pulses are fed into the integrator which integrates the successive pulses to produce output steps. Means are generally provided to restart this cycle after a certain number of steps or after a given output level has been reached. The circuitry required to achieve these functions is relatively complex. For example, one commercially sold transistor curve tracer employs a staircase generator which includes a Miller integrator circuit and a Schmitt trigger circuit in addition to level shifting and charging circuitry. In addition, inconsistencies in the amplitude or width of input pulses in this type of system cause undesirable variations in the height of the steps in the output waveform. The present invention is directed to an apparatus which generates a staircase waveform without the need for integrating the input pulses. In this invention the height of the steps in the output staircase waveform are substantially independent of the amplitude of the input pulses.

SUMMARY OF THE INVENTION

In the present invention means are provided for generating a periodic signal having a period at least as long as the interval between two successive input pulses. A sampling means coupled to the signal generating means samples the magnitude of this generated signal during each input pulse. In addition, means coupled to the output of the sampling means are provided for maintaining the sampled values during the interval between successive pulses. In a preferred embodiment of the invention the generated periodic signal is a sawtooth voltage which is synchronized by the input pulses.

Further features and advantages of the invention will become more readily apparent from the following detailed description when taken in conjunction with the accompanying drawings.

DESCRIPTION OF THE PREFERRED EMBODIMENT

Figure 1:
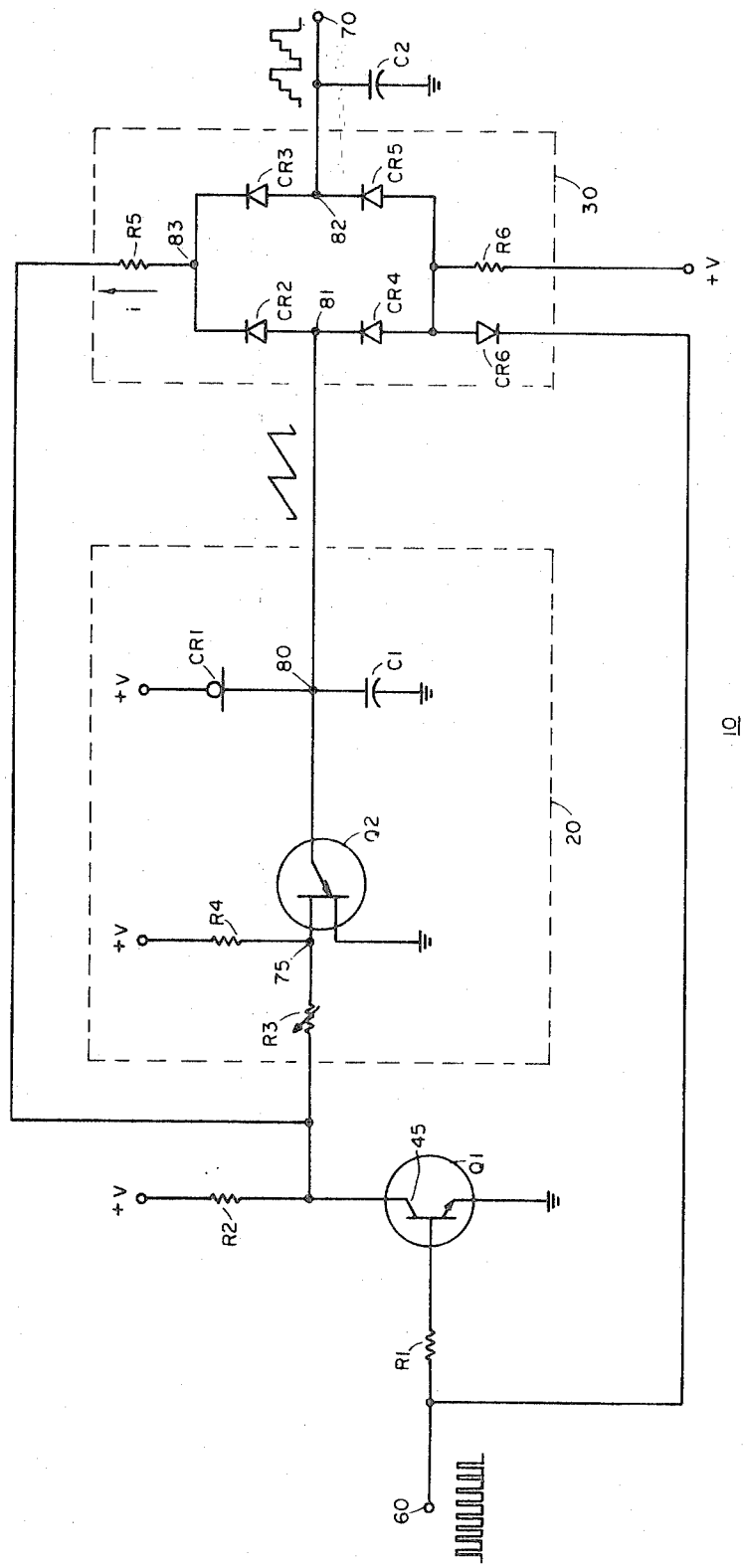
FIG. 1 is an electrical schematic diagram of an embodiment of the invention.

Referring now to FIG. 1 there is shown an embodiment of a staircase waveform generator 10 in accordance with the invention. A series of input pulses are received at input terminal 60 and a staircase waveform is generated at output terminal 70. Signal generating means 20, shown in this embodiment as a sawtooth generator, produces a periodic signal at terminal 80 which is samples by a sampler 30. The sawtooth generator has a period which is at least as long as the interval between two successive input pulses. Sampler 30 is actuated during each input pulse as will be explained below. The output of the sampler is maintained by the capacitor $C_2$ during the interval between successive input pulses.

The sawtooth generator 20 utilizes a unijunction transistor $Q_2$ which has its first base electrode coupled to a ground reference potential. The second base electrode 75 is coupled through a resistor $R_4$ to a bias potential $+V$ and is also coupled through variable resistor $R_3$ to the collector 45 of a transistor $Q_1$. The emitter electrode of unijunction transistor $Q_2$ is coupled to a bias potential $+V$ through a constant current source which is shown as field-effect current regulator $CR_1$. The emitter of $Q_2$ is also coupled through capacitor $C_1$ to ground. The constant current received by capacitor $C_1$ gives rise to a voltage ramp at terminal 80 which continues to increase until the voltage at terminal 80 reaches the firing voltage $V_f$ of the unijunction transistor $Q_2$. When this occurs $Q_2$ fires and the voltage at terminal 80 is returned to substantially ground potential. The ramp voltage at terminal 80 then builds up and fires again in repetitive fashion thereby producing the desired sawtooth voltage.

The sawtooth voltage at terminal 80 is received at the input terminal 81 of the sampler 30. Sampler 30 consists of diodes $CR_2$ through $CR_6$ and resistors $R_5$ and $R_6$. Resistor $R_6$ is coupled to a bias voltage $+V$ and resistor $R_5$ is coupled to the collector 45 of transistor $Q_1$. When the sampler is "on" the voltage at the output terminal 82 of the sampling means tracks the voltage at the input terminal 81. This "on" condition occurs when a current $i$ flows through the combination of the resistors $R_6$ and $R_5$ and the diode bridge consisting of $CR_2$ through $CR_5$. In the presence of this current it is seen that the voltages at terminals 81 and 82 must each be about 0.7 volts (the forward voltage drop across a silicon diode) above the voltage at terminal 83, and thus the voltages at terminals 81 and 82 must be substantially equal. The current $i$ flows when transistor $Q_1$ is turned on by the input pulses at input terminal 60 and, therefore, the sampler is "on" during the input pulses. The capacitor $C_2$ holds the voltage at terminal 82 substantially constant during the interval between input pulses when the sampler is "off."

Figure 2A:
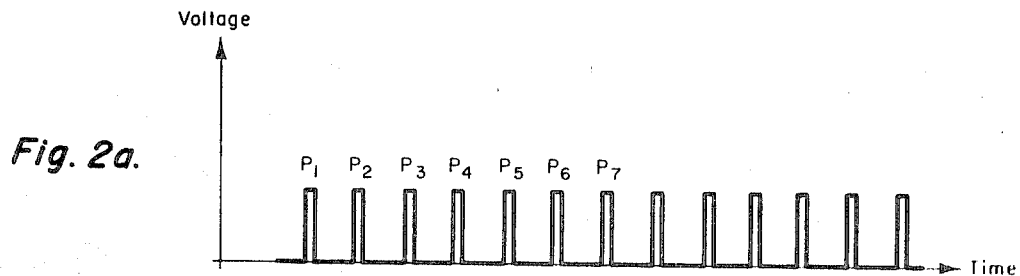
FIGS. 2A, 2B and 2C are idealized voltage waveforms useful in illustrating the operation of the circuit of FIG. 1.
Figure 2B:
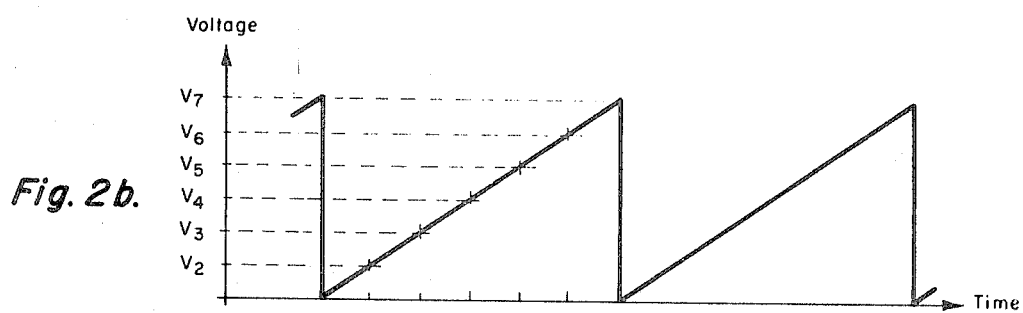
Figure 2C:
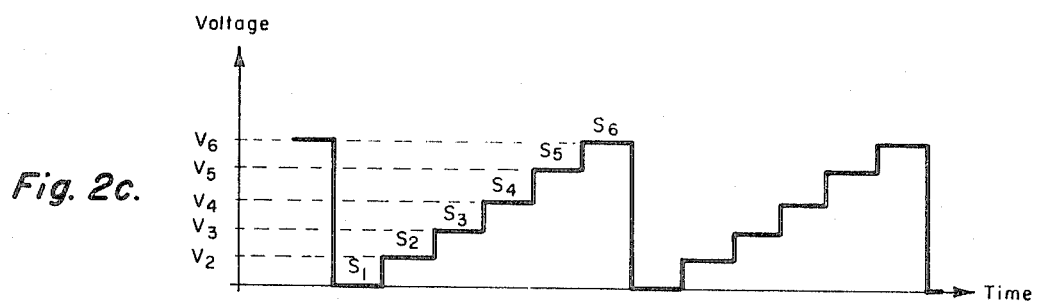

The operation of the staircase waveform generator 10 can be further explained with the aid of FIGS. 2A–2C. FIG. 2A represents the voltage input to terminal 60 which is a series of equally spaced input pulses. This input voltage is coupled to the base electrode of transistor $Q_1$ through resistor $R_1$. In the interval between pulses the voltage at input terminal 60 is at ground potential and $Q_1$ is therefore off. Each input pulse is of sufficient magnitude to drive the transistor $Q_1$ into saturation. Transistor $Q_1$ therefore acts as a switch with the voltage at collector 45 being at substantially ground potential during each input pulse.

FIG. 2B shows the sawtooth voltage generated at terminal 80 of signal generating means 20 and FIG. 2C represents the staircase output voltage at output terminal 70 of the staircase generator 10. During the interval between pulses the transistor $Q_1$ is off and diode $CR_6$ is coupled to ground potential insuring that the sampler is off. When a pulse is present at terminal 60, however, collector 45 is effectively grounded and the current $i$ flows turning on the sampler 30. Thus, for example, the pulse $P_2$ activates the sampler 30 at a time when the sawtooth voltage at terminal 80 has a value $V_2$. The voltage $V_2$ therefore appears at output terminal 70 and is held at this value by capacitor $C_2$ after the sampler is turned off. The voltage step $S_2$ is formed in this way. (The capacitor $C_2$ has a much smaller value than $C_1$ so that the voltage at terminal 80 is not appreciably altered by the sampler action.) The next pulse, $P_3$, activates the sampler 30 at a time when the sawtooth voltage has a value $V_3$. This voltage, in turn, appears at the output of the sampler and is held by capacitor $C_2$ to form the step $S_3$. In this manner the staircase voltage depicted in FIG. 2C is formed at output terminal 70. It will be appreciated that the heights of the output voltage steps are dependent upon the slope of the ramp voltage at terminal 80 and not upon the amplitude of the input pulses. This slope can be adjusted, for example, by changing the value of the capacitor $C_1$.

As illustrated in FIG. 2, the firing of the unijunction transistor $Q_2$ is synchronized by the input pulses. This is accomplished by coupling the base 75 of $Q_2$ to the collector 45 of $Q_1$ through resistor $R_3$. The voltage, $V_f$, at which the unijunction transistor will fire can be represented by the equation $$V_f = \eta V_b$$

where the constant $\eta$ is the intrinsic standoff ratio of the unijunction transistor $Q_2$, and $V_b$ is the instantaneous voltage at the base 75 of $Q_2$. In the interval between pulses the transistor $Q_1$ is off and the voltage $V_b$ is at a value $V_{b(Q_1\ off)}$ which is a function of the base-to-base resistance of $Q_2$. [This base-to-base resistance is generally of the order of 7 K ohms.] During an input pulse, however, the collector 45 is at substantially ground potential and resistor $R_3$ shunts the base 75 to ground. In this case, therefore, the voltage $V_b$ is at a lower value $V_{b(Q_1\ on)}$. It is thus seen that when the sawtooth voltage at terminal 80 reaches a voltage higher than $\eta V_{b(Q_1\ on)}$ the unijunction transistor will fire at the next input pulse. In FIG. 2, for example, the voltage $V_{b(Q_1\ on)}$ is greater than $V_6/\eta$ and less than $V_7/\eta$ When the pulse $P_7$ turns $Q_1$ on $Q_2$ will fire, since, at this time, $V_7 > \eta V_b$ and the condition for firing is met. The number of steps in the output voltage staircase can therefore be controlled adjusting resistor $R_3$ upon which $V_{b(Q_1\ on)}$ depends.

In a typical circuit the component values are as follows:

| | |
|---|---|
| $Q_1$ | Type 2N4401 |
| $Q_2$ | Type 2N4853 |
| $CR_1$ | Type 1N5300 |
| $CR_2$–$CR_8$ | Type 1N914 |
| $R_1$ | 3.3 K ohms |
| $R_2$ | 1.5 K ohms |
| $R_3$ | 5 K ohms |
| $R_4$ | 1 K ohms |
| $R_5$ | 100 K ohms |
| $R_6$ | 100 K ohms |
| $C_1$ | 20,000 picofarads |
| $C_2$ | 100 picofarads |

What is claimed is:

1. Apparatus for receiving a sequence of equally spaced input pulses and for generating a staircase voltage comprising:
   a. means for generating a periodic sawtooth voltage having a period at least as long as the interval between two successive input pulses;
   b. a sampler having its input coupled to the output of said sawtooth generating means;
   c. means coupled to said sampler for actuating said sampler during each of said input pulses, the output voltage of said sampler being proportional to the magnitude of the sawtooth voltage during the presence of said input pulses; and
   d. means coupled to the output of said sampler for maintaining the sampled voltage during the interval between successive input pulses.

2. The staircase voltage generator as defined by claim 1 wherein said actuating means is also coupled to said sawtooth generating means and synchronizes said sawtooth voltage with said input pulses.

3. Apparatus for receiving a sequence of equally spaced input pulses and for generating a staircase voltage comprising:
   a. means for generating a periodic sawtooth voltage having a period at least as long as the interval between two successive input pulses, said sawtooth generating means having a synchronizing terminal;
   b. a sampler having input, output and control terminals, the voltage at said output terminal tracking the voltage at said input terminal in response to signals at said control terminal, said input terminal being coupled to the output of said sawtooth generating means;
   c. a transistor having first, second, and control electrodes, said second electrode being coupled to a reference potential, said first electrode being coupled to the synchronizing terminal of said sawtooth generating means and to the control terminal of said sampler, the application of the input pulses to said control electrode rendering said transistor conductive as between said first and second electrodes thereby actuating said sampler and synchronizing the period of said sawtooth voltage with said input pulses; and
   d. a capacitor coupled between the output terminal of said sampling means and said reference potential.

4. Apparatus for receiving a sequence of equally spaced input pulses and for generating a staircase voltage comprising:
   a. a unijunction transistor having first base, second base, and emitter electrodes, said second base electrode being coupled to a bias voltage and said first base electrode being coupled to a reference potential;
   b. means for applying a voltage ramp to the emitter electrode of said unijunction transistor;
   c. a sampler having input, output and control terminals, the voltage at said output terminal tracking the voltage at said input terminal in response to signals at said control terminal, said input terminal being coupled to the emitter electrode of said unijunction transistor;
   d. a transistor having first, second and control electrodes, said second electrode being coupled to said reference potential, said first electrode being coupled to the second base of said unijunction transistor and to the control terminal of said sampler, the application of said input pulses to said control electrode rendering said transistor conductive as between said first and second electrodes; and
   e. a capacitor coupled between the output terminal of said sampling means and said reference potential.

5. The staircase voltage generator as defined by claim 4 further comprising a variable resistor which couples the second base of said unijunction transistor to the first electrode of said transistor.

6. The staircase voltage generator as defined by claim 5 wherein said means for applying a ramp voltage comprises:
   f. a constant current source coupled to the emitter electrode of said unijunction transistor; and
   g. a second capacitor coupled between said reference potential and the emitter electrode of said unijunction transistor.

7. The staircase voltage generator as defined by claim 6 wherein said sampler comprises:
   h. first and second series connected diodes coupled between the control terminal of said sampler and said bias voltage, a point intermediate said first and second diodes being the input terminal of said sampler;
   i. second and third series connected diodes coupled between the control terminal of said sampler and said bias voltage, a point intermediate said third and fourth diodes being the output terminal of said sampler.

8. The staircase voltage generator as defined by claim 7 wherein said sampler further comprises a fifth diode coupled between said bias voltage and the control electrode of said transistor, said fifth diode being poled to pass current whenever said control electrode is at said reference potential.

* * * * *